Oct. 22, 1940.	F. D. JONES ET AL	2,218,579
SWEEP RAKE
Filed Sept. 12, 1938	6 Sheets-Sheet 2

FIG-2

INVENTORS
FRANK D. JONES
GEORGE B. HILL
BY
ATTORNEYS

Oct. 22, 1940.　　F. D. JONES ET AL　　2,218,579
SWEEP RAKE
Filed Sept. 12, 1938　　6 Sheets-Sheet 6

INVENTORS
FRANK D. JONES
GEORGE B. HILL
BY
ATTORNEYS

Patented Oct. 22, 1940

2,218,579

UNITED STATES PATENT OFFICE 2,218,579

SWEEP RAKE

Frank D. Jones and George B. Hill, Ottumwa, Iowa, assignors to Dain Manufacturing Company of Iowa, Ottumwa, Iowa, a corporation of Iowa Application September 12, 1938, Serial No. 229,476

39 Claims. (Cl. 56—27)

The present invention relates generally to sweep rakes and more particularly to grain shock sweep rakes of the type in which the rake head carrying the raking teeth is pivotally mounted on a frame supported at least in part on a tractor, the power of which is utilized not only to push the rake forwardly in gathering position but also to rock the pivoted head so that the raking teeth may be raised from the grond to facilitate transporting the shocks of grain.

The principal object of our invention is to provide certain improvements in rakes of the type above referred to, which improvements have to do particularly with the manner and the means by which the rake is mounted on the tractor.

More specifically, it is an object of our invention to provide a tractor propelled implement which is supported for the most part on dirigible wheels interconnected with the dirigible wheels of the tractor, and which is pushed forwardly by frame members connected to the tractor body.

Another object of the present invention is to provide new and improved hitch means for quickly and easily connecting the pushing members of a tractor propelled implement to the rear axle housing of the propelling tractor.

Another object is to provide improved lifting connections between the lift mechanism of the tractor and the rake head of the implement whereby the rake head is held down to its lowered position and at the same time is allowed a limited amount of up and down movement to permit the rake teeth to follow the surface of the ground without unduly stressing the lifting connections.

A further object is to provide a bundle retainer which is operatively connected with the aforesaid lifting connections and is rigidly held in either its raised or its lowered position independently of the rake head and therefore is not affected by the up and down movement thereof except as initiated by the tractor power lift.

Another object is the provision of an improved push-off device actuated by the backing-up movement of the implement to push material forwardly off the rake teeth, and which is positively returned to its initial position after being so actuated independently of the movement of the tractor.

Still another object is to provide a ground engaging push-off device which is supported on the implement frame for lateral swinging to allow the ground engaging member to tilt and be withdrawn from the ground if the tractor is turned while backing up to discharge its load.

These and other objects and advantages of the present invention will become apparent after a consideration of the following detailed description of a preferred embodiment thereof together with the appended drawings in which:

Figure 2 is a side elevation of the same machine, showing the rake head down in gathering position;

Referring now to the drawings, the sweep rake 10 is mounted upon a tractor, indicated by the reference numeral 11, which includes a body 12 having a transversely disposed rear axle housing 13 in which drive axles 14 are journaled. Traction wheels 15 are adjustably secured to the drive axles 14. The front end of the tractor body 12 is supported on a pair of dirigible wheels 16 which are journaled on suitable axle spindles carried at the lower end of a steering post 17 and which are controlled by the usual steering gear 20. The tractor 11 also includes power lift mechanism 21, preferably although not necessarily, of the hydraulic lift type illustrated and described in Patent No. 2,107,760, issued February 8, 1938, to Elmer McCormick, Milford D. Stewart and Wayne H. Worthington. The power lift mechanism includes a transversely disposed rock shaft 22 journaled in and projecting laterally outward from a housing 23 which is carried on the rear axle housing 13.

The sweep rake 10 comprises, in general, a frame 24 swingably connected to the tractor body for vertical movement relative thereto and supported, for the most part, on a pair of laterally spaced dirigible wheels 25 and 26 disposed substantially in line with the tractor dirigible wheels 16. A rake head 30 is swingably supported on the front end of the frame 24 ahead of the tractor 11 for vertical swinging between gathering and transport positions, and pivotally supported on the frame 24 above and somewhat ahead of the rake head 30, and operatively connected therewith, is a bundle retainer 31.

The frame 24 includes two longitudinally extending beams or pushing members 32, 33, disposed on opposite sides of the tractor with their rear ends connected to the rear axle housing 13 in a manner to be described hereinafter. A transverse member 34 connects the beams 32, 33 and is rigidly fixed thereto in any suitable manner. Spaced forwardly from the member 34 is a second transverse member 35, preferably in the form of an angle iron, which is fixed to the two beams 32, 33 and extends laterally outwardly therefrom to provide bracing arms 36, 37. The center portion of the member 35 is bent downwardly to facilitate mounting and dismounting the implement on the tractor, as will become apparent hereinafter. Fixed to beams 32, 33, adjacent the transverse member 34 and diverging forwardly and outwardly therefrom are two beams 40, 40' which are bent forwardly, as at 41, 41' parallel to beams 32, 33 and are fixed to the ends of the bracing arms 36, 37, respectively.

Each of the beams 32, 33 is connected with its respective parallel member 41, 41' by a V-shaped arch 42 and a second arch 43 spaced rearwardly therefrom. The rear arch members 43 each consist of two vertical members 44 connected at their upper ends by a transverse member 45 and braced by bars 46 which extend downwardly and forwardly to the front ends of members 41, 41' and beams 32, 33, respectively. The transverse member 45 is braced by a bridge truss 50, while each of the rear arch members 43 is further braced by a pair of tie rods 51, 52. Tie rods 51 are each secured to the upper ends of the outer vertical members 44, passing rearwardly therefrom over compression struts 53 and being anchored at 54 to the beams 40, 40'. Tie rods 52 are each secured to the upper ends of the inner vertical members 44 and are anchored at 55 to their respective beams 32, 33 after passing over compression struts 56. A wheel support housing 60, preferably in the form of a casting having a substantially vertical sleeve, is fixed to the transverse member 45 and front arch member 42, and journaled in said housing sleeve is the vertical spindle of a forked axle body 61. The dirigible wheels 25, 26 are journaled on suitable axles on the axle bodies 61 and are controlled by the steering gear 20 through a steering arm 62 fixed to the base of the steering post 17 and extending upwardly and rearwardly therefrom. Likewise, steering arms 63 and 64 are fixed to the axle bodies 61 of the wheels 25, 26, respectively, and are connected by links 65 and 66 to steering arm 62. As will readily be seen in the drawings, the beams 32, 33 and members 41, 41' are substantially level with the axes of the wheels 25, 26, the purpose being to make possible a low point of support for the rake head 30 and at the same time provide a strong and rigid frame.

Figure 6:
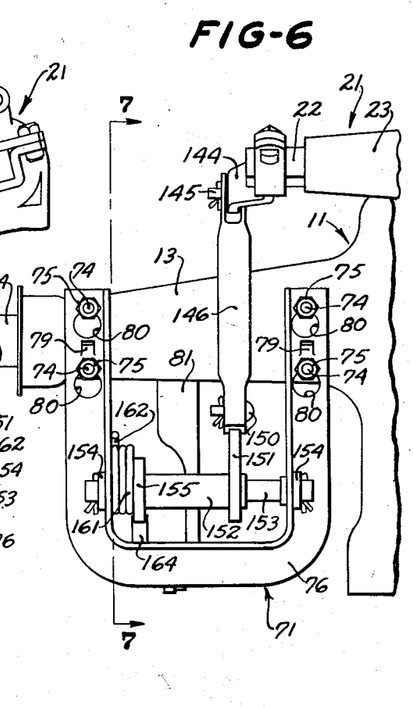
Figure 6 is a fragmentary rear view, drawn to even larger scale, of a portion of the lifting connections and brackets for mounting the implement on the tractor rear axle housing.
Figures 7, 8:
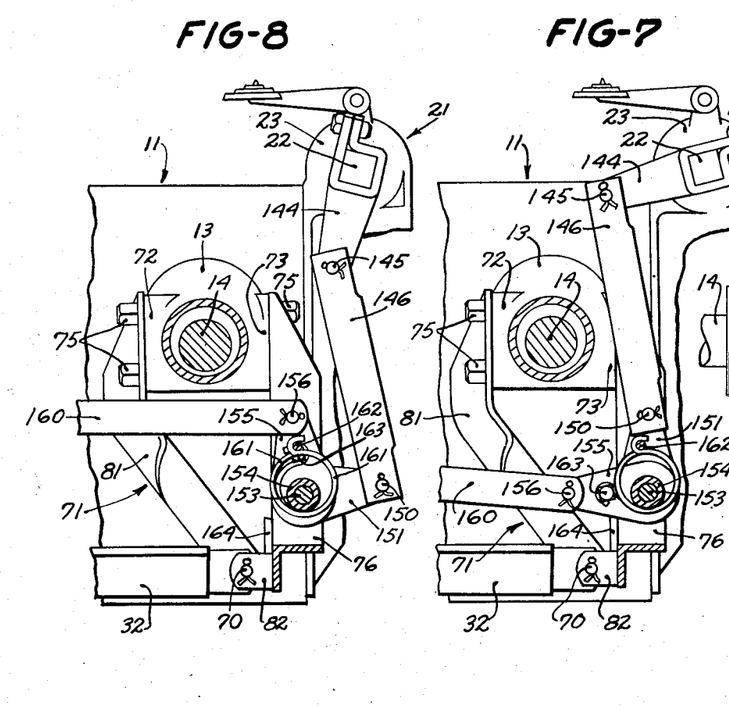
Figure 7 is a sectional view taken along the line 7—7 in Figure 6, showing the positions of the lifting connections when the rake teeth are lowered in gathering position.
Figure 8 is a view similar to Figure 7 but with the lifting connections in the positions assumed when the rake teeth are raised for transport.

The rear ends of the beams 32, 33 are pivotally connected, as by pins 70, to brackets 71 which are bolted to implement mounting bosses 72, 73 provided on the front and rear faces, respectively, of the rear axle housing 13, as best shown in Figures 6–8. Each of the bosses 72, 73 has two vertically spaced threaded apertures adapted to receive stud bolts 74, and screwed onto the latter are nuts 75. The brackets 71 each comprise a U-shaped angle iron member 76 mounted on the laterally spaced, rearwardly facing bosses 73, the legs of which are provided with two vertically spaced keyhole slots adapted to receive the stud bolts 74 and having enlarged openings 80 at the lower ends thereof to permit the brackets to be mounted over the nuts 75 without removing the latter. Between the two slotted openings 80 on each leg of the U-shaped member 76 is a tongue 79 which is adapted to fit into a suitable notch provided in the mounting bosses 73 to prevent the bracket from working its way up on the stud bolts 74 and coming loose, or, as will be seen presently, from being raised by the power lift mechanism 21 when the latter is actuated. A second angle iron member 81 is likewise provided with a pair of vertically spaced slots and is mounted on the forwardly facing boss 72, extending downwardly and rearwardly therefrom. At its lower end, the second member 81 is connected by the pin 70 to a bifurcated bracket 82 which is fixed, as by welding, to the U-shaped member 76. Thus, it will be seen that the two members 76 and 81 act to brace each other, and the thrusts of the beams 32, 33, resulting from pushing the rake forwardly, are applied as torque to the rear axle housing 13.

The front end of the implement is braced against lateral thrust by means of a U-shaped bumper 83 which is fixed to a bracket 84 and the latter is bolted, as at 85, to the under side of the tractor body 12. Complementary bumpers 86 are fixed to the beams 32, 33 in position to contact the bumper 83 if the implement is deflected to either side relative to the tractor, and replaceable rub plates 90 are provided on the bumper 83 to take the wear resulting from the rubbing together of the bumpers.

Figure 4:
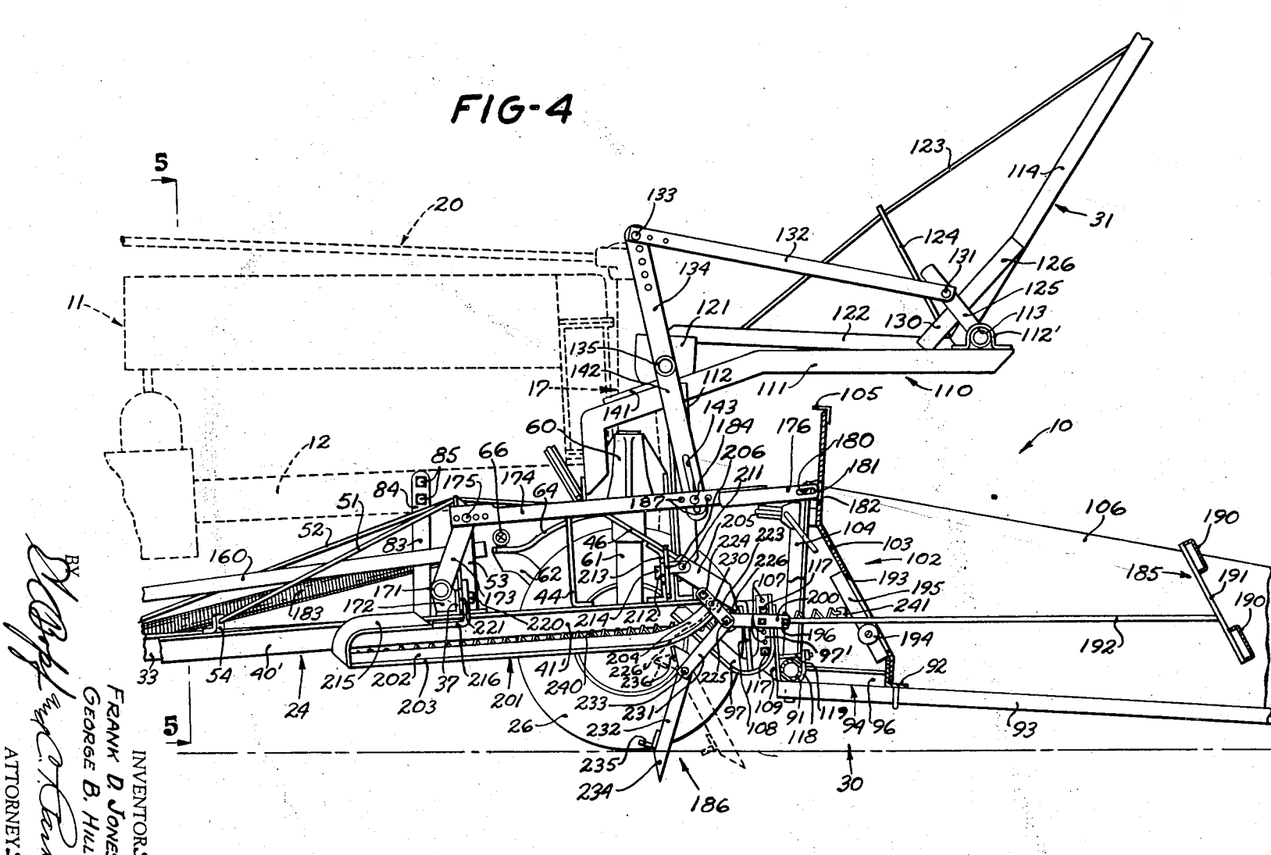
Figure 4 is a partially sectioned view, drawn to an enlarged scale, showing the push-off device in its extreme forward position.
Figure 9:
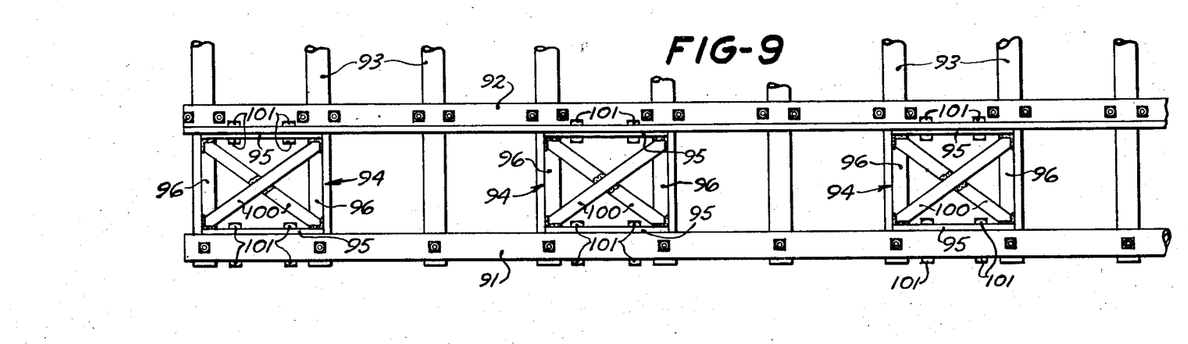
Figure 9 is a detail plan view of a portion of the rake head.

The rake head 30 comprises a transversely disposed pipe or tubular member 91 and a transverse angle iron 92 spaced forwardly therefrom. A plurality of rake teeth 93, preferably formed of tubing and having pointed front ends, are suitably fixed to the transverse members 91, 92. The rake head 30 is braced by means of a series of laterally spaced truss members 94 (see Figure 9) disposed between transverse members 91, 92 and each comprising a rectangular box frame made up of transverse bars 95, fore and aft extending angle iron members 96, and diagonal cross members 100, all welded together to form a unitary rigid bracing member. The truss members 94 are bolted to the transverse members 91, 92 by bolts 101. Also supported on the rake head 30 is the usual back board 102 comprising a sheet iron shield 103 fixed to the transverse angle iron 92 and including upwardly and rearwardly therefrom. The upper portion of the shield 103 is fastened to suitable uprights 104 fixed to the pipe 91, and is further held rigid by means of an angle iron 105 which is fixed to the upper edge thereof and extends transversely across the width of the shield. Side shields 106 are secured to the outer rake teeth 93 and extend forwardly from the back board 102 to within a short distance of the front ends of the teeth to prevent shocks of grain from falling off either side of the rake. The rake head 30 is pivotally supported on the frame 24 and vertically adjustable relative thereto, through the agency of four brackets 97 fixed to the front ends of the beams 32, 33, 41 and 41', respectively, as best shown in Figure 4. Each of the brackets 97 is preferably made of angle iron bent into a generally U-shaped figure, one leg of which is fixed to its respective beam and the other leg of which presents an upright portion 97' having a plurality of spaced holes 107 in one flange thereof. A vertical bar 108 is rigidly connected, as by welding, to the end of the associated frame member and to the lower curved portion of the bracket 97 for bracing the latter. Mounted on each of the brackets 97 is a complementary bracket member 109 comprising a vertical angle iron having flanges cooperating with the flanges of the upright portion 97' and vertically spaced holes corresponding to the holes 107 in the latter. Two connecting bolts 117 are passed through any two sets of aligned holes 107 to securely fasten the bracket member 109 to the bracket 97 in any of several vertical positions. The lower end of the bracket member 109 is provided with an upwardly curved hook portion 118 which is adapted to receive and hold the pipe 91. A bolt 119 passed through aligned holes in the hook 118 above the pipe 91 holds the latter down into the hook, providing the equivalent of a bearing support for the rake head 30.

Figure 5:
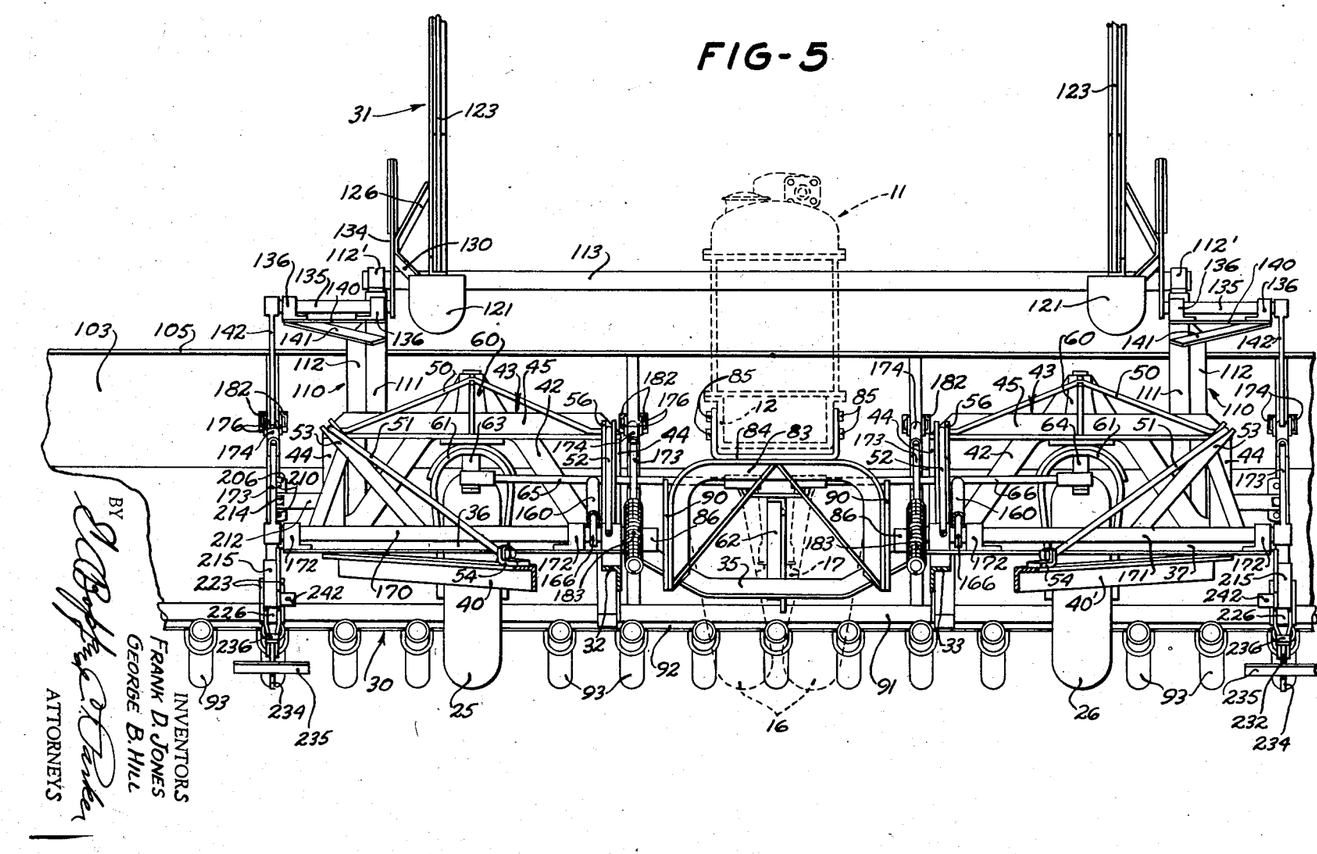
Figure 5 is a sectional view taken along the line 5—5 in Figure 4.

The bundle retainer 31 is pivotally supported on a frame 110 comprising a pair of laterally spaced, generally L-shaped angle iron members 111, each of which is fixed to the transverse member 45 of its respective wheel arch and extends forwardly therefrom over the rake head 30. A vertical bracing strut 112 fixed to the front arch member 42 provides additional support for the frame member 111. Journalled in suitable bearings 112' provided at the front ends of the frame members 111 is a transverse hollow shaft 113, and rigidly fixed thereto are a pair of laterally spaced arms 114 which extend forwardly and are curved downwardly, as at 115. The front ends of the arms 114 are rigidly interconnected by a transverse angle iron 116 and bracing struts 120. The weight of the arms 114 is partly offset by a pair of counterbalance weights 121 carried at the ends of arms 122 which are fixed to the shaft 113 and extend rearwardly therefrom, preferably at an angle to the arms 114 as shown, to clear the back board 102 and associated structure. A bracing rod 123 is anchored at one end to arm 122 and at the other end to arm 114, passing over a compression strut 124 which is fixed to the shaft 113, and trussing the arms 114, 122 together. Rigidly fixed to the shaft 113 and connected to arms 114, 122 by bars 126 and 130 are a pair of laterally spaced levers 125, each of which is pivotally connected at 131 to a rearwardly extending link 132. The rear end of each of the links 132 is pivotally connected at 133 to a lever arm 134 which is fixed to a short, transverse tubular shaft 135, best shown in Figure 5. The latter is journaled in a pair of spaced bearings 136 carried on an arm 140 which is fixed to the frame member 111 and extends laterally outwardly therefrom. A bracing member 141 is fixed to the outer end of arm 140 and extends diagonally rearwardly to frame member 111 to which it is also fixed. Secured to the outer end of shaft 135 is a downwardly extending lever arm 142 having a long slot 143 in the end thereof, and lever arm 142 is operatively connected with the lifting gear for raising and lowering the rake teeth 93 in a manner that will be disclosed presently.

The rake head 30 is swung between gathering and transport positions by power derived from the hydraulic lift 21 on the tractor and transmitted by linkage including lifting arms 144 which are clamped upon each end of the rock shaft 22. (See Figures 6-8.) Each of the lifting arms 144 is pivotally connected by a pin 145 to a link 146, and the latter is connected, in turn, by a pin 150 to an arm 151 preferably but not necessarily formed integral with and extending outwardly from a hub member 152. The latter is fixed on a shaft 153 which is journaled in suitable bearings 154 provided in the flanges of the U-shaped bracket member 76. Also formed integral with the hub 152 and spaced substantially ninety degrees from arm 151 is a second arm 155, the outer end of which is pivotally connected by a pin 156 to the rear end of a forwardly extending link 160. The hub member 152, in effect, serves as a pivotally mounted connecting bell crank having arm portions 151 and 155.

In Figure 8 the lifting connections are shown in the positions they occupy when the rake head is in its lifted or transport position, and when the power lift is tripped to permit the rake head to drop to raking position the parts assume the positions shown in Figure 7. One of the characteristics of the hydraulic lift shown is that the rock shaft 22 is locked only in its raised position (Figure 8) and in order that the rake may be positively held in a lowered position to force the rake teeth to follow closely along the ground surface, the hub member 152 is caused to swing past dead center with respect to the link 160 and thereby lock the lifting connections against movement except that initiated by the power lift 21. To this end a coiled torsion spring 161 is provided, said spring embracing the shaft 153 and being anchored at 162 to the bracket member 76 and connected at 163 to arm 155 to urge the latter downwardly against a limit stop 164 fixed to the bracket member 76. Thus, when the power lift 21 is tripped to lower the rake to gathering position, the bell crank hub member 152 is rotated to a position approximating that shown in Figure 7 by the lifting arm 144 and link 146, and is further boosted by the spring 161 to bring the arm 155 down past dead center relative to the link 160 and up against the limit stop 164.

Figure 1:
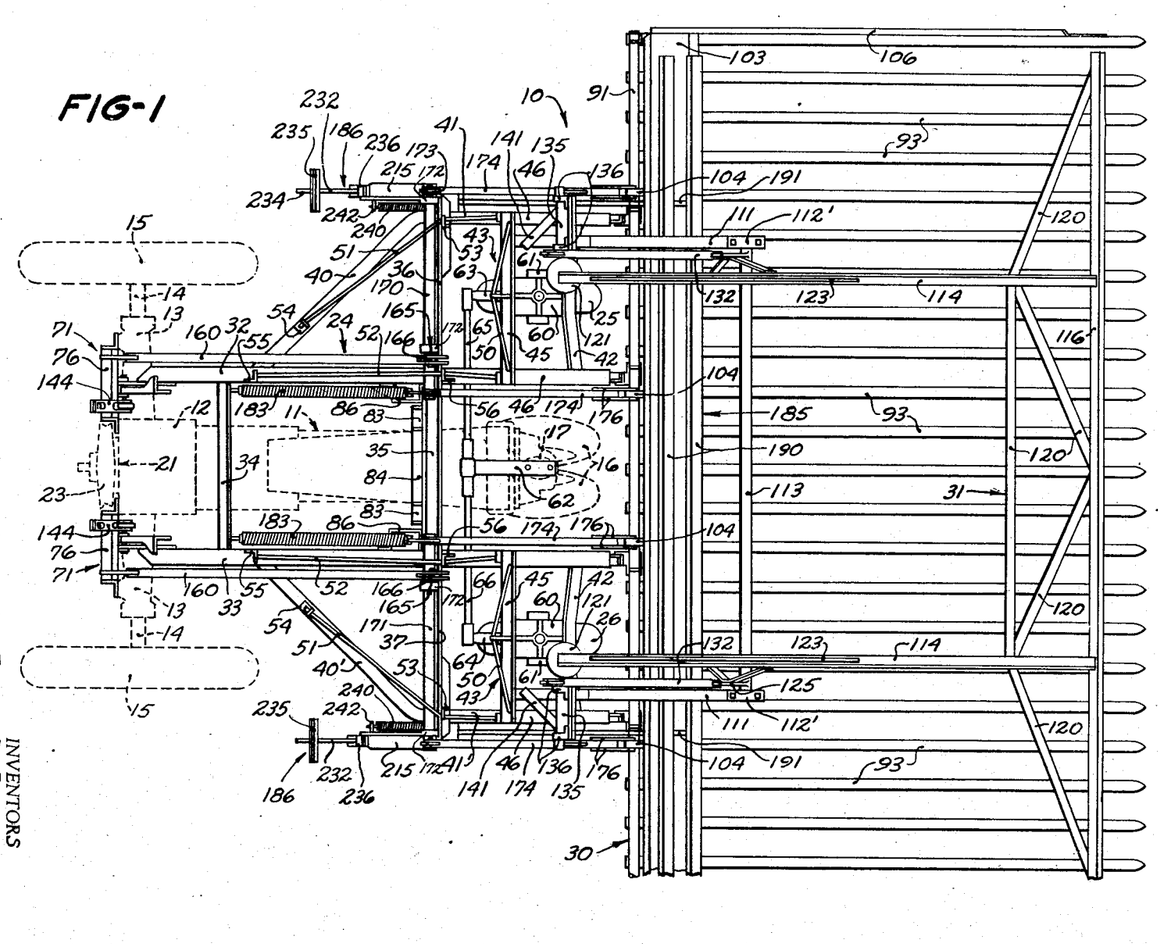
Figure 1 is a plan view of a tractor mounted sweep rake embodying the principles of our invention.

The two links 160 extend forwardly along opposite sides of the tractor from the arms 155 and are pivotally connected at 165 (see Figures 1 and 5) to arms 166 which are rigidly fixed to aligned transverse rock shafts 170, 171. Shafts 170, 171 are rotatably supported on the laterally extending frame members 36, 37, respectively, in spaced bearings 172, and rigidly fixed to each end of each shaft 170, 171 is an upright arm 173. A link 174 is pivotally connected at 175 to each of the lever arms 173 and reaches forwardly therefrom, having a pair of spaced bars 176 fixed to the front end thereof and arranged to pass on opposite sides of the adjacent upright 104. The bars 176 are slotted, as at 180, (Figure 4), to receive a pin 181 which is fastened to the associated upright 104, connecting the link 174 with the rake head 30 and at the same time providing a limited amount of lost motion therebetween to permit the rake teeth to rise and fall as they follow the surface of the ground without stressing the lifting connections. The shield 103 is apertured at 182 to allow the ends of the bars 176 to pass through when the rake head is tilted.

The power lift mechanism is assisted in raising the rake teeth by two tension springs 183 which are anchored at their rear ends to the transverse frame member 34 and are connected to the inner lever arms 173 of the shafts 170, 171. These springs exert an appreciable lifting force on the rock shaft 171 and relieve the tractor hydraulic lift 21 of a considerable portion of the work.

Furthermore, these springs have a limited supporting effect during operation, for although the lifting connections are locked over center when the rake teeth are down, there is sufficient play in the pivots and torsional displacement in the rock shafts 170, 171, to permit the springs to relieve the rake teeth of a portion of the weight when the pin 181 is bearing at the forward end of the slot 180. Although we have found that the amount of play in the pivots incidental to the usual manufacturing tolerances is sufficient to obtain the desired spring action, it is evident that an additional amount of play may be provided if more spring action is required.

Figure 3:
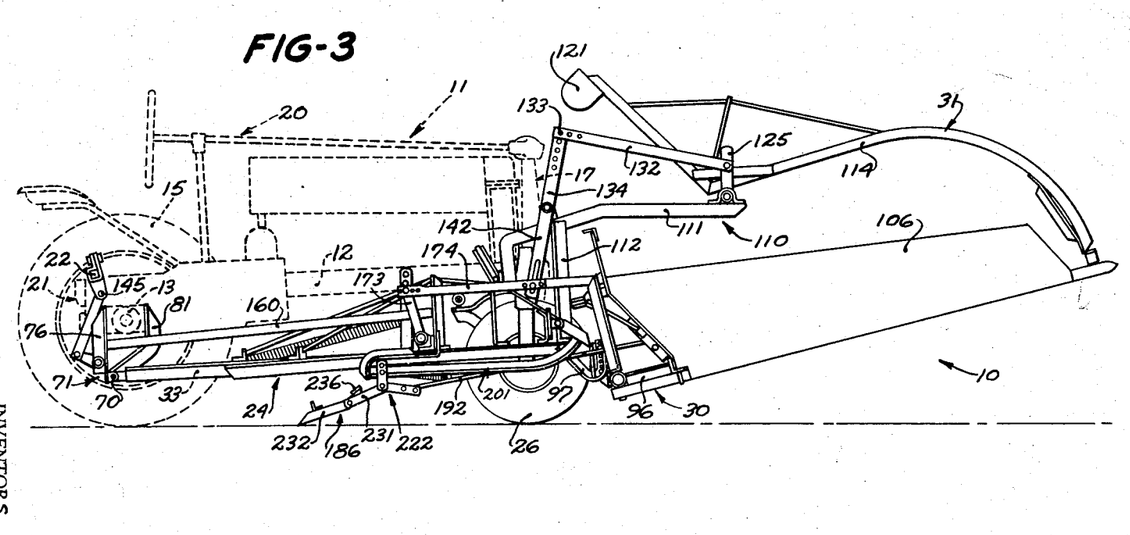
Figure 3 is a view similar to Figure 2 but with the rake head raised in transport position.

The bundle retainer 31 is raised and lowered by the same lifting connections which actuate the rake head and is operatively connected therewith by means of a pin bolt 184 which is secured in one of several holes 187 in the link 174 and engages the slot 143 in the lever arm 142. When the rake head is raised by the tractor power lift 21, the link 174 moves rearwardly, swinging the lever arm 142 with it in a clockwise direction and thereby lowering the bundle retainer 31 to the position shown in Figure 3. Conversely, when the rake head is lowered to gathering position, the link 174 moves forwardly, swinging the arm 142 in a counterclockwise direction to the position shown in Figure 2. The function of the slot 143 is to allow the connecting pin bolt 184 to slide along the length thereof and thus accommodate the distance between the shaft 135 and the connecting bolt 184 to the path followed by the latter as the link 174 moves back and forth. The slot 143 also allows the rake head 30 to be moved up or down on the brackets 97 without necessitating a corresponding adjustment of the connecting bolt 184 along the arm 142. In either the raised or lowered position the bundle retainer is locked against movement other than by operation of the tractor power lift 21 by reason of its connection at 184 with the lifting linkage actuating the rake head. As set forth previously, the lifting linkage is locked in the raised or transport position by the mechanism of the power lift 21, while in the lowered or gathering position the over-center relation of the bell crank arm 155 with the link 160 locks the lifting connections against movement.

The shocks of grain are unloaded from the rake by means of a push-off rack 185 which is actuated by a ground engaging stop 186 when the implement is backed up. The push-off rack 185 comprises a pair of spaced slats 190 extending across the width of the rake head 30 and disposed in a plane substantially parallel with the back board 102. Two laterally spaced cross members 191 connect the slats 190, and fixed to each of said cross members is a push rod 192, which passes rearwardly through a slot 193 in the back board shield 103 and over a roller 194 journaled in flanges 195 provided at the sides of the slot. The rear end of the push rod 192 is pivotally connected at 196 to a link 200 which forms part of the ground engaging stop 186.

Supported on the outer members 41, 41' of the frame 24 are fore and aft extending tracks 201, preferably made of T-beams having a vertical flange 202 and a horizontal flange 203 at the lower edge thereof. Preferably, the front end of the track 201 is curved upwardly, as at 204, and is welded or otherwise rigidly fixed to an upwardly and rearwardly inclined strap 205. A mounting bracket 206 having a plurality of vertically spaced holes 210 (see Figure 5) is pivotally connected at 211 to the end of the strap 205 and is swingably secured, in turn, to a laterally extending arm 212 fixed to a vertical brace member 213 on the frame 24, by means of a bolt 214 which is passed through one of the holes 210 and an aligned hole in the arm 212. An angle iron member 215 is preferably welded to the rear end of the track 201 and is bent forwardly, having an L-shaped bracket 216 fixed to the front end thereof. The vertical arm of the bracket 216 is pivotally connected by a bolt 220 to a lug 221 which is fixed to and extends laterally from the end of the transverse member 36, 37. Thus, the track 201 is pivotally supported on the frame 24 for lateral swinging about the axis of the two bolts 214, 220 to allow the ground engaging stops 186 to trail with the implement if the tractor is turned while backing up, and prevent damage to the parts.

The ground engaging stop 186 includes a track follower 222 comprising a pair of straps 223 disposed on opposite sides of the track 201 and connected together at top and bottom by bolts 224 and 225. A roller 226 is journaled on the shank of the lower bolt 225 and is adapted to bear against the under side of the horizontal track flange 203. A pair of rollers 226' (Figure 4) disposed on opposite sides of the vertical track flange 202 are journaled on the straps 223 at 230, and are adapted to bear against the top side of flange 203. The link 200 which is connected with the push rod 192, and a second link 231, preferably in the form of two spaced parallel straps, are both pivotally connected to the straps 223 by the lower bolt 225. Link 231 inclines downwardly and rearwardly from the track follower 222 and is adapted to receive and hold a foot or spade 232 which is pivotally conected thereto at 233. The end of the spade 232 is pointed, as at 234, to dig into the earth and is provided with a cross bar 235 fixed rigidly thereto to limit the depth to which is pivotally connected thereto at 233. The opposite end of the spade is extended beyond the pivot 233 and provided with a limit stop 236 which engages the link 231 to limit the clockwise swinging of the spade 232 relative to the link.

The operation of the push-off device is as follows:

Normally the push-off rack 185 and ground engaging stop 186 are held in their rearwardmost position by two springs 240 which are connected to the push rods 192 at 241 and are anchored to lugs 242 fixed to and extending laterally inwardly from the ends of members 215. The spade 232 trails freely behind the track follower 222 when the implement is driven forwardly. To unload the rake, the implement is backed up, causing the spade points 234 to dig into the ground and the link 231 to swing downwardly until engaged by the limit stop 236 on the spade. The track follower 222 is thus held stationary by the locked spade 232 and link 231 while the track 201 moves rearwardly with the implement and tractor, and the push-off rack 185 is moved forwardly relative to the rake teeth 93 to push the grain shocks off the front ends of the teeth.

As the track follower rides up the upwardly curved portion 204 of the track 201, the spade 232 swings under the link 231 to a disabled position, shown in dotted lines in Figure 4, allowing the spring 240 to pull the track follower 222 back to the rear end of the track 201, and thus return the push-off to normal position. With the first few feet of forward travel of the implement, the spade 232 digs into the ground and is swung back under the link 231 to the normal trailing position shown in Figures 2 and 3.

To dismount the implement from the tractor 11, it is necessary only to remove the lifting arms 144 from the ends of the power lift rock shaft 22, loosen the cap nuts 75 and lift the brackets 71 off the mounting bosses 72, 73 on the rear axle housing 13, disconnect the steering links 65, 66 from the steering arm 62, and back the tractor out from the frame 24, letting the front wheels 16 of the tractor ride over the transverse members 34 and 35.

What we claim as our invention is:

1. In combination with a tractor, an implement comprising a pair of fore and aft extending pushing members disposed on either side of said tractor, respectively each of said members comprising a pair of laterally spaced beams having a ground wheel disposed therebetween, a wheel supporting structure extending between each pair of beams, an axle body mounted on each of said wheel supporting structures for turning about a vertical axis, said ground wheels being journaled on said axle bodies, a tool pivotally supported on the front end of said beams for swinging between a raised transport position and a lowered operative position, and means for raising and lowering said tool.

2. In combination with a tractor, an implement comprising a pair of fore and aft extending pushing members disposed on either side of said tractor, respectively, and pivotally connected thereto at their rear ends for vertical swinging, each of said members comprising a pair of laterally spaced beams having a ground wheel disposed therebetween, a transverse wheel support structure connecting each pair of beams, said structure including a vertically disposed sleeve, an axle body having a spindle adapted to be rotatably received within said sleeve, said ground wheels being journaled on said axle bodies, a transversely extending tool disposed ahead of said tractor and pivotally connected to the front ends of said beams for vertical swinging, and means for swinging said tool between operative and inoperative positions.

3. In combination with a tractor having a body supported in part on a dirigible wheel, an implement comprising a pair of longitudinally extending pushing members disposed on either side of said tractor, respectively, and connected thereto for relative vertical movement, each of said members consisting of a pair of laterally spaced beams having a ground wheel disposed therebetween substantially in transverse alignment with said tractor dirigible wheel, a wheel supporting structure extending between each pair of beams, an axle body mounted on each of said wheel supporting structures for turning about a vertical axis, said ground wheels being journaled on said axle bodies, means responsive to the turning of said tractor dirigible wheel for steering said implement wheels in unison therewith, a tool pivotally supported on the front end of said beams for vertical swinging, and means for swinging said tool between operative and inoperative positions.

4. In combination with a tractor supported in part on a dirigible wheel, a sweep rake comprising a pair of longitudinally extending pushing members disposed on either side of said tractor, respectively, and pivotally connected thereto at their rear ends for vertical swinging, each of said members comprising a pair of laterally spaced beams having a ground wheel disposed therebetween, said beams being positioned below the top of said wheel, a transverse arch extending above said wheel and connecting said pair of beams together, means for supporting each of said wheels on its respective arch for turning about a vertical axis, means interconnected with said tractor dirigible wheel for steering said implement wheels in unison therewith, a transversely disposed rake head pivotally connected to the front ends of said beams for vertical swinging, said rake head having a plurality of forwardly extending rake teeth, and means for swinging said rake head between operative and inoperative positions.

5. In combination with a tractor supported in part on a dirigible wheel, a sweep rake comprising a pair of longitudinally extending pushing members disposed on either side of said tractor, respectively, and pivotally connected thereto at their rear ends for vertical swinging, each of said members comprising a pair of laterally spaced beams having a ground wheel disposed therebetween, said beams being positioned substantially level with the axis of said wheel, a transverse arch extending above said wheel and connecting said pair of beams together, a vertically disposed sleeve bearing supported on said arch, an axle body having a spindle journaled in said sleeve bearing, said ground wheels being journaled on said axle bodies, means for steering said ground wheels in unison with said tractor dirigible wheel, a transversely disposed rake head pivotally connected to the front ends of said beams ahead of said tractor, said rake head having a plurality of forwardly extending rake teeth, and means for raising and lowering said rake head between operative and inoperative positions.

6. In an implement the combination of a wheeled frame, a tool carried on said frame, a push-off rack for moving material away from said tool, a longitudinally disposed track supported on said frame by means providing for limited lateral movement of said track relative to said frame, a track follower adapted to ride on said track and having means adapted to engage the earth and hold the follower stationary when said implement is moved in one direction, and means operatively connecting said track follower with said push-off rack to actuate the latter.

7. The combination, with a sweep rake having a wheel supporting frame, a rake head provided with a plurality of forwardly extending rake teeth, and a rack for pushing material forwardly off said teeth, of a push-off device comprising a longitudinally disposed track supported on said frame and having the front end thereof inclined upwardly, a track follower adapted to run on said track and having earth engaging stop means engageable with the earth when said implement is backed up, said inclined end of the track acting to raise said stop means as said track follower runs up the incline, whereby said stop means is disengaged from the earth upon continued backing of the implement, and means connecting said track follower with said rack.

8. A sweep rake comprising, in combination, a wheel supported frame, a rake head provided with a plurality of forwardly extending rake teeth carried on said frame, a push-off rack for pushing material forwardly off said teeth, a fore and aft extending track supported on said frame, a track follower adapted to run on said track and normally positioned at the rear end thereof, an earth-engaging spade carried on said track follower and adapted to dig into the earth when said implement is backed up to move the track follower forwardly along said track, means responsive to the position of said follower along said track for disabling said spade, spring means for returning said track follower to the rear end of the track, and means operatively connecting said track follower with said push-off rack.

9. A sweep rake comprising, in combination, a wheel supporting frame, a rake head supported on said frame and having a plurality of forwardly extending teeth, a push-off rack, a fore and aft extending track fixed on said frame and having the front end thereof curved upwardly, a track follower adapted to run on said track and normally positioned at the rear end thereof, said track follower having an earth-engaging stop comprising a link pivotally connected with said follower, a spade pivotally connected with said link and engageable with the earth when said implement is backed up, and means for limiting the swinging of said spade relative to said link in one direction, said spade being swung in the opposite direction to inoperative position as said track follower rides up the curved portion of said track, spring means for returning said track follower to the rear end of said track, and means operatively connecting said track follower with said push-off rack.

10. In a sweep rake the combination of a wheel supported frame, a rake head supported on said frame, a push-off rack, a fore and aft extending track pivotally connected to said frame for swinging about a longitudinal axis, a track follower adapted to run on said track and having earth-engaging stop means, means for disabling said stop means at a predetermined position along said track, and means operatively connecting said track follower with said push-off rack to actuate the latter.

11. In a sweep rake the combination of a wheel supported frame, a transversely disposed rake head having a plurality of forwardly extending rake teeth, means for pivotally connecting said rake head to said frame for vertical swinging about a transverse axis including a plurality of laterally spaced bearing brackets journaled on said rake head, and means for connecting said bearing brackets to said frame for vertical adjustment relative thereto.

12. In a sweep rake, the combination of a frame, a rake head provided with a plurality of rake teeth pivotally supported on said frame for vertical swinging, lifting means having connections with said rake head to swing the latter between operative and inoperative positions, a bundle retainer pivotally supported on said frame, and means connecting said lifting means with said bundle retainer to swing the latter in unison with said rake head, there being a limited amount of lost motion in said connections providing for some swinging movement of said rake head relative to said bundle retainer.

13. In a power operated sweep rake, the combination of a wheel supported frame, a rake head pivotally connected to said frame for vertical swinging and having a plurality of forwardly extending rake teeth, power lift means including connections with said rake head for swinging the latter between operative and inoperative positions, means for locking said power lift connections in either of said positions, a bundle retainer pivotally supported on said frame above said rake head, and means connecting said power lift connections with said bundle retainer to swing the latter in unison with said rake head there being a limited amount of lost motion in said power lift connections between said rake head and said bundle retainer connecting means, whereby a certain amount of swinging movement of said rake head will not be transmitted to said bundle retainer.

14. The combination with a tractor including a rear axle housing having at least one pair of vertically spaced stud bolts extending outwardly from one side thereof and two laterally spaced pairs of vertically spaced stud bolts extending outwardly from the opposite side thereof with nuts threaded on the outer ends of said stud bolts, of hitch means for detachably connecting an implement to said housing comprising a bracket member having two pairs of vertically spaced key hole slots formed therein adapted to pass over said nuts and be supported on said two pairs of stud bolts, a second bracket member having a pair of vertically spaced key hole slots formed therein adapted to cooperate with said first mentioned pair of stud bolts, means for restraining said bracket members against vertical movement relative to the housing, means for connecting said bracket members together, and means for connecting the implement with said hitch means.

15. The combination with a tractor including a rear axle housing having a pair of vertically spaced stud bolts extending outwardly from the front side thereof and two laterally spaced pairs of vertically spaced stud bolts extending outwardly from the back side thereof with nuts threaded on the outer ends of said stud bolts, of hitch means for detachably connecting an implement to said housing comprising a U-shaped bracket member having a pair of vertically spaced key hole slots in each leg thereof adapted to cooperate with the two pairs of stud bolts on the back side of said housing whereby said bracket member may be slipped over said nuts and supported on the stud bolts between the nuts and housing, a second bracket member having a pair of vertically spaced key hole slots adapted to cooperate with the pair of stud bolts on the front side of said housing in like manner, means for pivotally connecting said second bracket member to said U-shaped bracket member for swinging about a transverse axis, and means for connecting the implement to said pivotal connecting means.

16. The combination with a tractor including a rear axle housing having at least one pair of vertically spaced stud bolts extending outwardly from one side thereof and two laterally spaced pairs of vertically spaced stud bolts extending outwardly from the opposite side thereof with nuts threaded on the outer ends of said stud bolts, of hitch means for detachably connecting a sweep rake to said housing comprising a bracket member having two spaced portions adapted to be secured to said axle housing by said two pairs of stud bolts, a second bracket member adapted to be secured to said axle housing by said first mentioned stud bolts, means for connecting said bracket members together, said sweep rake having a frame and a rake head supported thereon for vertical movement between operative and inoperative positions and lift mechanism for raising and lowering said rake head, means rotatably supported between said spaced bracket portions for operating said implement lift mechanism, and means for actuating said operating means.

17. In combination with a tractor having power lift mechanism, a sweep rake comprising a frame mounted on said tractor, a transversely disposed rake head pivotally supported on said frame for vertical swinging, link means connecting said power lift mechanism with said rake head for swinging the latter between gathering and transport positions, means for locking said link means against motion when said rake head is in either of said positions, there being a limited amount of lost motion in the connections between said rake head and said link means, a bundle retainer pivotally supported on said frame above said rake head, and means connecting said link means with said bundle retainer for swinging the latter in unison with said rake head.

18. A sweep rake comprising in combination, a wheel supported frame, a rake head pivotally supported thereon for movement about a transversely disposed axis, rake teeth fixed to said rake head, lifting connections for swinging said head about said axis to raise and lower said teeth, and resilient means for exerting a continuous lifting force upon said lifting connections to relieve a portion of the pressure of said teeth against the ground and to assist in swinging said head to raise the teeth.

19. A tractor propelled sweep rake comprising a wheel supported frame, a rake head pivotally supported thereon for movement about a transversely disposed axis, rake teeth fixed to said rake head, lifting connections adapted to be connected to lifting mechanism on the tractor, for swinging said head about said axis to raise and lower said teeth, said connections including an over-center lock for locking the teeth in lowered position, and having lost motion to permit said head to move in a limited extent relative thereto, and spring means connected to exert a continuous lifting force upon said lifting connections to relieve a portion of the weight from the rake teeth and to assist in swinging said head to raise the teeth.

20. In combination with a vehicle, an implement associated therewith, means for raising and lowering said implement relative to said vehicle including a lifting device and lifting connections between said device and said implement, said lifting connections including an over-center lock for locking the implement in a lowered position, and a lifting spring acting on said lifting connections between said lock and the implement.

21. A tractor sweep rake comprising in combination, a pair of inner pusher beams extending fore and aft and laterally spaced to receive a tractor therebetween, means for transmitting a pushing force to the rear ends of said beams from the tractor and providing for vertical movement of the beams relative to the tractor, a pair of outer pusher beams spaced outwardly from said inner beams and generally parallel thereto, transverse tie members interconnecting said beams, a ground wheel disposed on each side of the tractor between each pair of associated inner and outer pusher beams, means supporting said wheels on said transverse tie members, and a rake head extending transversely across the front ends of said pusher beams and supported thereon.

22. A tractor sweep rake comprising in combination, a pair of inner pusher beams extending fore and aft and laterally spaced to receive a tractor therebetween, means for pivotally connecting the rear ends of said beams to the rear axle housing of the tractor for transmitting a pushing force thereto and providing for vertical swinging movement of said beams, a pair of outer pusher beams spaced outwardly from said inner beams, transverse tie members interconnecting each pair of associated inner and outer beams and including at least one tie member extending transversely under the tractor for interconnecting the opposite pairs of beams, a ground wheel disposed on each side of said tractor between each pair of inner and outer beams and generally in transverse alignment with the front dirigible wheels of the tractor, means supporting said beams on said ground wheels providing for dirigible movement of the latter, means connecting said ground wheels with the tractor steering gear for steering said wheels in unison with the front wheels of the tractor, a rake head extending transversely across the front of the tractor, means pivotally connecting said rake head to the forward ends of said pusher beams for tilting movement about a transverse axis, and means under control of the tractor operator for tilting said rake head.

23. In an implement the combination of a wheeled frame, a tool carried on said frame, a push-off rack for moving material away from said tool, a longitudinally disposed track supported on said frame, a track follower adapted to ride on said track and having means adapted to engage the earth and hold the follower stationary when said implement is moved in one direction, spring means for returning said track follower to normal position at one end of said track, and means operatively connecting said track follower with said push-off rack to actuate the latter.

24. A sweep rake comprising, in combination, a wheel supported frame, a rake head supported on said frame and having a plurality of forwardly extending teeth, a push-off rack, a fore and aft extending track fixed on said frame and having the front end thereof curved upwardly, a track follower adapted to run on said track and normally positioned at the rear end thereof, an earth engaging spade pivotally connected with said track follower and adapted to dig into the earth when said implement is backed up to limit the rearward movement of the track follower, said spade swinging to inoperative position as the track follower rides up the curved portion of said track, and means operatively connecting said track follower with said push-off rack.

25. In an implement of the class described, having a push-off rack, an earth engaging device connected thereto for holding said push-off rack against rearward movement with said implement when the latter is backed to discharge material therefrom, said device comprising a link member carried on the implement for swinging movement fore and aft, an earth engaging member pivoted to said link member, means preventing said members from folding together in one direction whereby the device rigidly braces the rack against the ground when the implement is backed, means causing said device to be lifted, near the effective end of the backing movement, sufficiently to cause said device to fold together upon further backing of said implement.

26. In a sweep rake having a frame, a rake head supported thereon, and a plurality of forwardly projecting teeth supported on said head, a push-off rack slidable fore and aft over said teeth, a push rod connected to said rack and extending rearwardly beyond said rake head, means connected to said push rod by which the latter is actuated to cause said rack to slide forwardly relative to said rake teeth, and a spring connected between said frame and said push rod for returning said rack rearwardly to normal position.

27. In a sweep rake having a frame, a rake head supported thereon, and a plurality of forwardly projecting teeth supported on said head, a push-off rack slidable fore and aft over said teeth, a push rod connected to said rack and extending rearwardly beyond said rake head, means on said rake head for supporting said push rod providing for fore and aft shifting movement of the latter, an actuating member connected with said push rod and engageable with the ground upon backing of said rake, thereby causing said rod and rack to slide forwardly relative to said rake teeth, and a spring connected between said frame and said push rod for returning said rack rearwardly to normal position.

28. In a sweep rake, the combination of a wheel supported frame, a transversely disposed rake head having a plurality of forwardly extending rake teeth, means for pivotally connecting said rake head to said frame for vertical swinging about a transverse axis including a plurality of laterally spaced bracket members swingably connected to said rake head, said frame including members for supporting said bracket members, certain of said members having vertically spaced apertures, and means insertable selectively in said apertures for fixing said bracket members to said frame members in a plurality of vertically spaced positions relative thereto.

29. A tractor mounted sweep rake comprising in combination, a pair of pushing members spaced laterally to receive a tractor therebetween, means swingably supporting the rear ends of said members on the tractor, ground supported means spaced laterally on opposite sides of the tractor for supporting the forward ends of said members, a rake head disposed transversely ahead of the tractor, and means pivotally connecting said rake head to the forward ends of said members, said connecting means including means for adjusting the rake head vertically relative to said pushing members.

30. A tractor sweep rake comprising in combination, a pair of inner pusher beams extending fore and aft and laterally spaced to receive a tractor therebetween, means for transmitting a pushing force to the rear ends of said beams from the tractor and providing for vertical movement of the beams relative to the tractor, a pair of outer pusher beams spaced outwardly from said inner beams and generally parallel thereto, transverse tie members interconnecting said beams, a ground wheel disposed on each side of the tractor between each pair of associated inner and outer pusher beams, means supporting said wheels on said transverse tie members, a rake head extending transversely across the front ends of said pusher beams and means pivotally connecting said rake head with each of said pusher beams, said connecting means including means for adjusting the rake head vertically relative to said beams.

31. A tractor mounted sweep rake comprising in combination, a pair of pushing members spaced laterally to receive a tractor therebetween, means swingably supporting the rear ends of said members on the tractor, ground supported means spaced laterally on opposite sides of the tractor for supporting the forward ends of said members, a rake head disposed transversely ahead of the tractor, and means pivotally connecting said rake head to the forward ends of said members, said connecting means including brackets journaled on said rake head, and means for bolting said brackets to said pushing members in any of a plurality of vertically spaced positions.

32. A tractor sweep rake comprising in combination, a pair of inner pusher beams extending fore and aft and laterally spaced to receive a tractor therebetween, means for transmitting a pushing force to the rear ends of said beams from the tractor and providing for vertical movement of the beams relative to the tractor, a pair of outer pusher beams spaced outwardly from said inner beams and generally parallel thereto, transverse tie members interconnecting said beams, a ground wheel disposed on each side of the tractor between each pair of associated inner and outer pusher beams, means supporting said wheels on said transverse tie members, a rake head extending transversely across the front ends of said pusher beams, the latter having a plurality of vertically spaced apertures disposed in the ends thereof, brackets journaled on said rake head, and means insertable selectively through said apertures for fixing said brackets to said beams in a plurality of vertically spaced positions relative thereto.

33. The combination with a tractor having a rear axle housing provided with an implement mounting fixture on one side thereof and two laterally spaced implement mounting fixtures on the opposite side thereof, of hitch means for detachably connecting an implement to said housing comprising a bracket member spanning between said two laterally spaced fixtures and having mounting means cooperable therewith, a second bracket member having mounting means cooperable with the first mentioned fixture, means for connecting said bracket members together, and means for connecting the implement with said hitch means.

34. The combination with a tractor having a rear axle housing provided with an implement mounting fixture on the front side thereof and two laterally spaced implement mounting fixtures on the back side thereof, of hitch means for detachably connecting an implement to said housing comprising a U-shaped bracket member having mounting means in each leg thereof adapted to cooperate with said spaced fixtures on the back of said housing, a second bracket member having mounting means cooperable with said fixture on the front side of said housing, means for pivotally connecting said second bracket member to said U-shaped bracket member for swinging about a transverse axis, and means for connecting the implement to said pivotal connecting means.

35. The combination with a tractor having a rear axle housing provided with an implement mounting fixture on the front side thereof and two laterally spaced implement mounting fixtures on the back side thereof, of a sweep rake comprising a fore and aft extending push beam disposed along the side of said tractor, a rake head carried on the forward end of said beam, and hitch means connecting said sweep rake to said tractor comprising a U-shaped bracket member having mounting means in each leg thereof adapted to cooperate with said spaced fixtures on the back of said housing, a second bracket member having mounting means cooperable with said fixture on the front side of said housing, means for pivotally connecting said second bracket member to said U-shaped bracket member for swinging about a transverse axis, and said beam being swingably supported on said pivotal connecting means.

36. The combination with a tractor including a rear axle housing having a pair of vertically spaced stud bolts extending outwardly from one side thereof and two laterally spaced pairs of vertically spaced stud bolts extending outwardly from the opposite side thereof with nuts threaded on the outer ends of said stud bolts, of hitch means for detachably connecting an implement to said housing comprising a bracket member having two spaced portions adapted to be secured to said axle housing by said two pairs of stud bolts, means rotatably supported between said spaced portions for operating lift mechanism on the implement, means for actuating said operating means, a second bracket member adapted to be secured to said axle housing by said first mentioned stud bolts, means for connecting said bracket members together, and means for connecting the implement to said hitch means.

37. The combination with a tractor having power lift mechanism and a rear axle housing provided with a pair of vertically spaced stud bolts extending outwardly from the front side thereof and two laterally spaced pairs of vertically spaced stud bolts extending outwardly from the back side thereof with nuts threaded on the outer ends of said stud bolts, of hitch means for detachably connecting an implement to said housing comprising a U-shaped bracket member having a pair of vertically spaced keyhole slots in each leg thereof adapted to cooperate with the two pairs of stud bolts on the back side of said housing whereby said bracket member may be slipped over said nuts and supported on the stud bolts between the nuts and the housing, a second bracket member having a pair of vertically spaced keyhole slots adapted to cooperate with the pair of stud bolts on the front side of said housing in like manner, means for pivotally connecting said second bracket member to said U-shaped bracket member, means for connecting the implement to said pivotal connecting means, a bell crank member rotatably supported on said U-shaped bracket, link means operatively connecting said bell crank with lift mechanism on the implement, and operating connection between said bell crank member and said tractor power lift mechanism.

38. A tractor sweep rake comprising a pair of pushing members disposed longitudinally along opposite sides of a tractor and connected to the latter at their rear ends, ground wheel means supporting the forward ends of said members, a rake head disposed transversely in front of the tractor and pivotally supported on the front ends of said pushing members for swinging movement about a transverse axis, a transversely disposed rock shaft journaled on each of said pushing members, each of said rock shafts having laterally spaced arms fixed thereto, connections between said arms and said rake head, and means for rocking said rock shafts to swing said head.

39. A tractor sweep rake comprising a pair of pushing members disposed longitudinally along opposite sides of a tractor and connected to the latter at their rear ends, each of said members comprising a rigid frame including a pair of laterally spaced beams and transverse members interconnecting said beams, and a ground wheel journaled on each of said frames for supporting the forward ends thereof, a rake head pivotally supported on said frames for swinging movement about a transverse axis, a rock shaft journaled transversely on each of said frames, connections between each of said rock shafts and said rake head, and means for rocking said rock shafts to swing said head about said transverse axis.

FRANK D. JONES.
GEORGE B. HILL.